United States Patent
Farré Berga

(10) Patent No.: US 8,978,525 B2
(45) Date of Patent: Mar. 17, 2015

(54) COUPLING STRUCTURE BETWEEN SCREW HEAD AND TIGHTENING TOOL

(75) Inventor: Ramón Farré Berga, Lleida (ES)

(73) Assignee: Universal Ball Head, S.L., Lleida (ES)

( * ) Notice: Subject to any disclaimer, the term of this patent is extended or adjusted under 35 U.S.C. 154(b) by 0 days.

(21) Appl. No.: 13/264,693

(22) PCT Filed: Apr. 14, 2010

(86) PCT No.: PCT/ES2010/000159
§ 371 (c)(1),
(2), (4) Date: Jan. 9, 2012

(87) PCT Pub. No.: WO2010/119149
PCT Pub. Date: Oct. 21, 2010

(65) Prior Publication Data
US 2012/0103147 A1    May 3, 2012

(30) Foreign Application Priority Data

Apr. 16, 2009 (ES) .................................. 200900998

(51) Int. Cl.
| | | |
|---|---|---|
| B25B 23/00 | (2006.01) | |
| F16B 23/00 | (2006.01) | |
| B25B 13/48 | (2006.01) | |
| B25B 15/00 | (2006.01) | |

(52) U.S. Cl.
CPC ............. B25B 15/005 (2013.01); F16B 23/003 (2013.01); B25B 13/481 (2013.01)
USPC ............................................... 81/460; 81/436

(58) Field of Classification Search
USPC ...................................... 81/436–461; 411/403
See application file for complete search history.

(56) References Cited

U.S. PATENT DOCUMENTS

| | | | |
|---|---|---|---|
| 2,182,568 A | | 12/1939 | Olson |
| 2,984,995 A | * | 5/1961 | Kalen ........................... 464/159 |
| 3,658,105 A | | 4/1972 | Burt et al. |
| 4,246,811 A | * | 1/1981 | Bondhus et al. ................ 81/436 |
| 4,824,418 A | * | 4/1989 | Taubert ........................ 464/159 |
| 5,251,521 A | * | 10/1993 | Burda et al. .................... 81/460 |
| 5,408,905 A | * | 4/1995 | Mikic et al. .................... 81/460 |
| 2011/0217675 A1 | * | 9/2011 | Farre Berga .................. 433/172 |

FOREIGN PATENT DOCUMENTS

| | | |
|---|---|---|
| DE | 298 06 156 | 7/1998 |
| DE | 102 08 605 | 1/2002 |
| WO | WO 2009/015871 | 2/2009 |

OTHER PUBLICATIONS

International Search Report for International Application No. PCT/ES2010/000159 dated Jul. 16, 2010.
Inaki et al., Numerical simulation of a novel screw-driver connection for implant prosthetics, International Association for Dental Research, General Session, Barcelona, Spain, Jul. 14-17, 2010, one (1) page.

* cited by examiner

*Primary Examiner* — Monica Carter
*Assistant Examiner* — Melanie Alexander
(74) *Attorney, Agent, or Firm* — Merchant & Gould P.C.

(57) ABSTRACT

A coupling structure between a screw head and a tightening tool includes a recess (3) with a curved concave surface on the free base of the head (1) of the screw (2) and a protuberance (6) with a curved convex surface finishing the end of the tool (5). The recess has axial projections (4) internally and the protuberance (6) has meridional grooves (7).

3 Claims, 2 Drawing Sheets

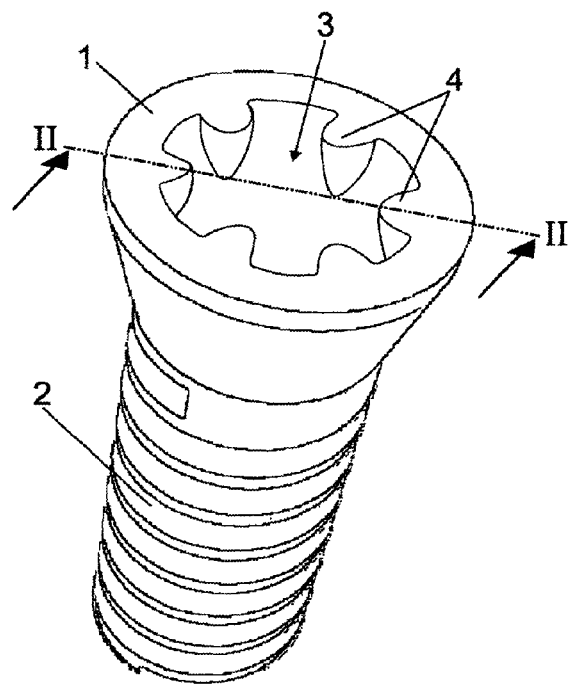
FIG. 1
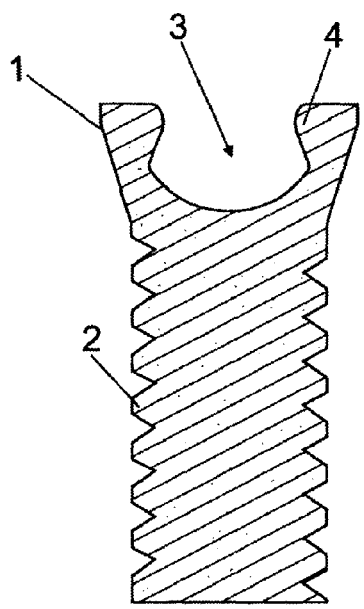
FIG. 2
FIG. 3
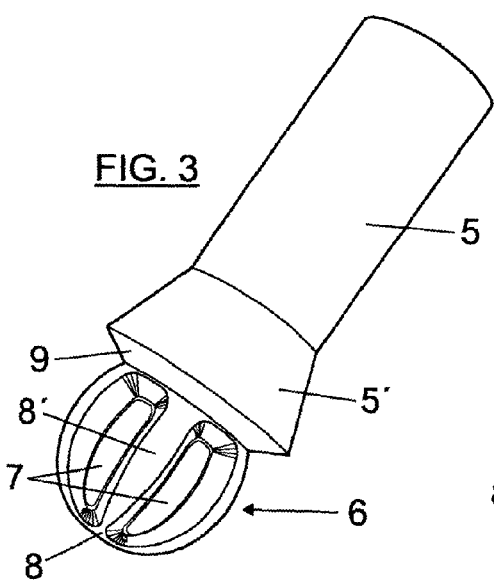
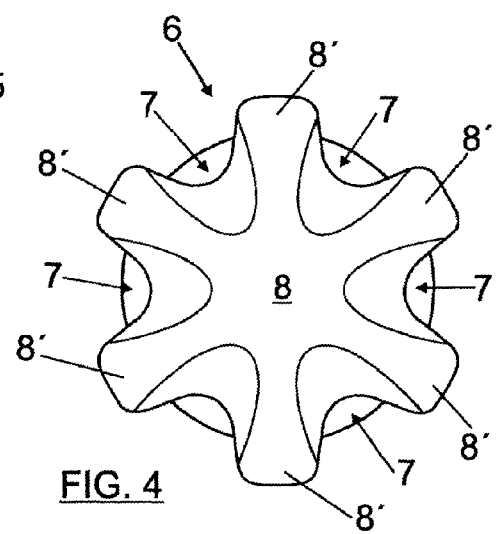
FIG. 4

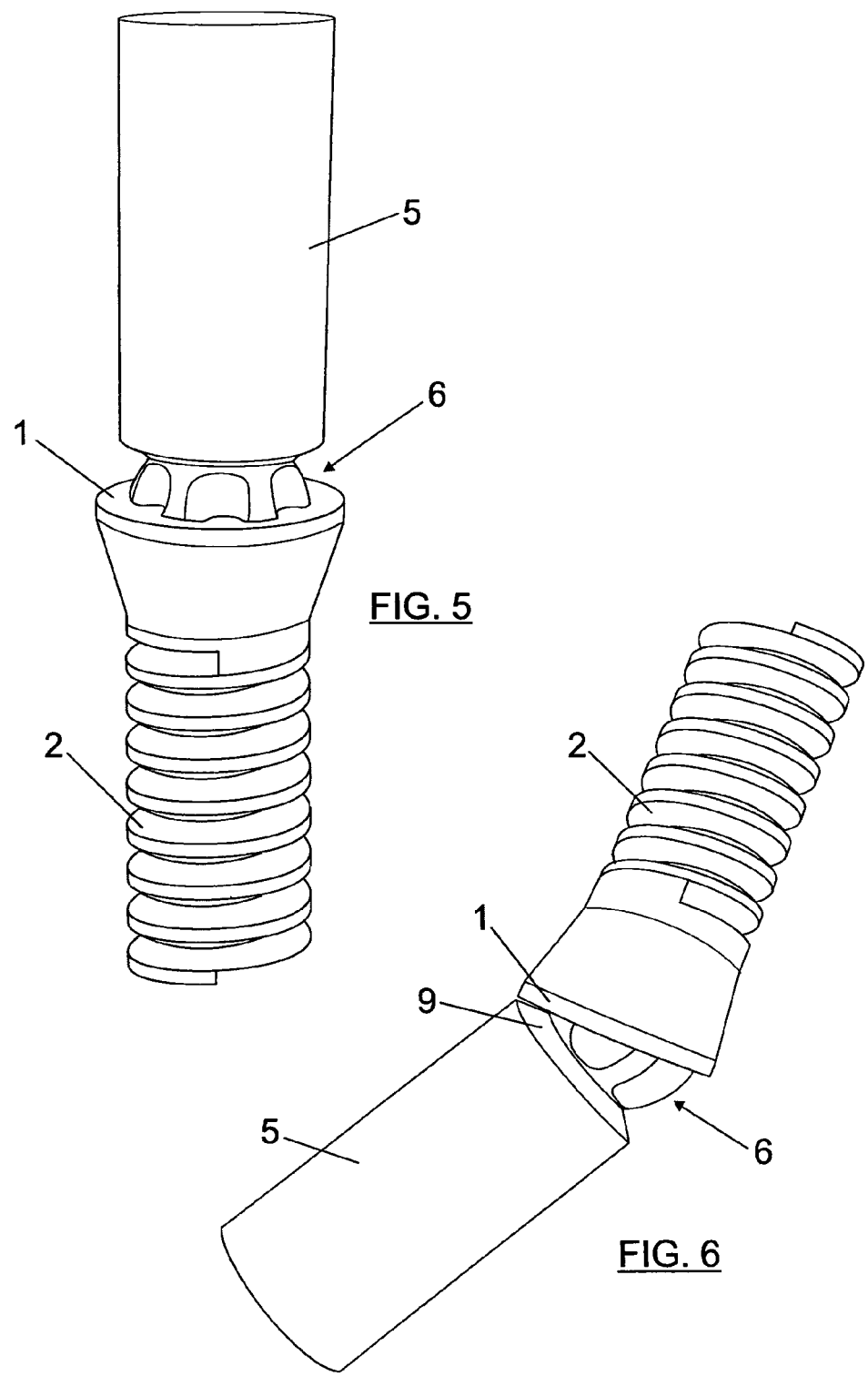

COUPLING STRUCTURE BETWEEN SCREW HEAD AND TIGHTENING TOOL

This application is a National Stage Application of PCT/ES2010/000159, filed 14 Apr. 2010, which claims benefit of Serial No. P200900998, filed 16 Apr. 2009 in Spain and which applications are incorporated herein by reference. To the extent appropriate, a claim of priority is made to each of the above disclosed applications.

FIELD OF THE INVENTION

The present invention refers to a coupling structure between screw head and tightening tool, designed to secure a perfect coupling between the tool and the screw head, even when the axes of both components are not completely aligned, allowing inclinations of the tool, with respect to the axis of the screw head, of up to 30°.

BACKGROUND OF THE INVENTION

Traditional coupling structures between screw head and tightening tool are constituted by a diametric groove done in the screw head and a tool end ending in a wedge, with a profile which can be inserted in the groove of the screw head.

There are also known coupling structures called star couplings, in which the head has a cross-shaped recess and the tool end finishes in a cross-shaped point.

In all these cases, in order to attain a threading or unthreading of the screw, the axis of the tool must be aligned with the screw head, which requires good accessibility of the screw. In all cases in which the tool does not affect the screw head in alignment with the axis of said screw, a correct action on the screw is not possible, both for the threading and unthreading thereof, making it impossible to carry out these operations or at least requiring great efforts which also cause the deterioration of the screw head and/or the tool end.

There are also known coupling structures between screw head and tightening tool, based on configurations of curved surfaces which can be complementarily coupled to each other, in which the screw head adopts a curved convex configuration, while the tool end adopts a curved concave configuration, which can be coupled onto the screw head, both of them featuring complementary grooves and recesses. This configuration considerably complicates the manufacturing, both of the screw and of the tool and it also has the risk of breaking the screw head when it is subjected to high tightening torques.

DESCRIPTION OF THE INVENTION

The object of the present invention is a coupling structure between screw head and tightening tool, allowing actions on the screw head, both in threading and unthreading operations, even when the tool is not aligned with the axis of said head, being possible to form with it angles of up to 30°.

Another object of the invention is to attain a coupling structure between screw head and tightening tool which enables to transmit a high tightening torque on the screw, both for the threading and unthreading thereof, without any risk of causing deterioration of said components.

According to the present invention, the coupling structure between screw head and tightening tool comprises a recess with a curved concave surface on the free base of the screw head, and a protuberance with a curved convex surface finishing the end of the tightening tool and which has a diameter slightly smaller than that of the recess of the screw head.

The curved concave recess of the screw head has inwardly, from the edge of the walls of said recess, axial projections with a curved convex surface and whose transverse section decreases towards the inside of the recess.

As for the protuberance of the tool end, it has meridional grooves with transverse curved concave section, decreasing towards the pole of said protuberance. The grooves of said protuberance will have a transverse section slightly bigger than the axial projections of the recess of the screw head.

The axial projections of the recess of the screw head delimit a minimum outline the diameter of which ranges between the maximum diameter of the protuberance of the tool end and the diameter of the outline defined by the bottom of the meridional grooves of said protuberance.

The constitution described secures the coupling of the protuberance of the tool end inside the recess of the screw head and also the coupling between the projections of the recess of the screw head and the meridional grooves of the protuberance of the tool end.

On the other hand, the curved concave shape of the recess of the screw head and the curved convex shape of the protuberance of the tool end secure the coupling between both components although the axis thereof is not perfectly aligned, even with deviations of up to 30°, which facilitates action on the screw head even when there is difficult accessibility of said head.

The number and circumferential position of the grooves of the protuberance of the tool end and of the recess projections of the screw head will be coincidental.

Both the recess of the screw head and the protuberance of the tightening tool end will preferably have a substantially spherical surface.

The axial projections of the recess interior of the screw head will not reach the bottom of said recess.

As for the meridional grooves of the protuberance of the tool end, they will start from the base of said protuberance, reaching the areas close to the pole thereof.

Inside the recess of the screw head, the axial projections thereof will be circumferentially separated from one another by a distance greater than the minimum width of these projections.

As for the meridional grooves of the protuberance of the tool end, they will be separated from one another by spherical lunes with a maximum width smaller than the separation between the consecutive axial projections of the recess of the screw head.

BRIEF DESCRIPTION OF THE DRAWINGS

The attached drawings show, as a non-limiting example, a possible embodiment of the coupling structure between the screw head and the tool end, wherein:

FIG. 1 is a perspective view of the screw, which head is constituted according to the invention.

FIG. 2 is a diametric section of the same screw, taken according to the cutting line II-II of FIG. 1.

FIG. 3 is a perspective view of the tightening tool for the screw of FIGS. 1 and 2.

FIG. 4 is a plan view of the end of the tightening tool shown in FIG. 3.

FIGS. 5 and 6 show a perspective view of coupling positions between the tool and the screw head.

DETAILED DESCRIPTION OF AN EMBODIMENT

The coupling structure between the screw head and the tightening tool end is constituted by configurations of curved surfaces comprising, on the head 1 of a screw 2, FIGS. 1 and 2, a recess 3 with a curved concave surface, from which lateral surface there protrude, from the free edge of the wall limiting this recess 3, axial projections 4 with a curved convex surface and transverse section decreasing towards the inside or bottom of the recess, as it can be better seen in FIG. 2.

As for the tightening tool, FIGS. 4 and 5, it comprises a rod 5 which finishes at its end in a protuberance 6 with a curved convex surface, the diameter of which is slightly smaller than that of the recess 3 of the screw head.

Preferably, the recess 3 of the screw head 1 and the protuberance 6 of the tool 5 end will have an approximately spherical surface.

The protuberance 6 has meridional grooves 7 with a transverse curved concave section, decreasing towards the pole 8 of the protuberance. These grooves 7 will have a transverse section slightly bigger than that of the axial projections 4 of the recess 3 of the screw head 1. The meridional grooves 7 start from the protuberance 6 base and reach the area close to the pole 8 of said protuberance. These meridional grooves 7 are separated from one another by spherical lunes 8' with a maximum width smaller than the separation between consecutive axial projections 4 of the recess 3 of the screw head 1.

The axial projections 4 of the recess 3 of the screw head, FIGS. 1 and 2, delimit a minimum outline the diameter of which ranges between the maximum diameter of the protuberance 6 of the tool end, FIGS. 3 and 4, and that of the outline defined by the bottom of the meridional grooves 7 of said protuberance.

As it can be seen in FIGS. 1 to 4, the number and circumferential position of the meridional grooves 7, FIGS. 3 and 4, and of the axial projections 4, FIGS. 1 and 2, will coincide in the protuberance 6 of the tightening tool end and in the recess 3 of the screw 2 head 1.

As it can be seen in FIGS. 1 and 2, the axial projections 4 of the recess inside of the screw head do not reach the bottom of said recess.

With the constitution described, the coupling of the protuberance 6 of the tightening tool 5 end in the recess 3 of the screw 2 head 1, FIG. 5, is secured, even though the axes of both components are not perfectly aligned, as shown in FIG. 6, allowing deviations of said axes of up to 30°.

The rod 5 of the tool can be cylindrical in all its length, as shown in FIG. 6, or else it can end in a section 5' with a truncated cone-like configuration, as shown in FIG. 3. In any case, the rod end will have, in a position adjacent to the protuberance 6, a truncated cone-like surface 9, which will act as a stop against the screw head 1, when the threading or unthreading operation is carried out with an inclination of the tool, with respect to the axis of the screw 2, as shown in FIG. 6.

The invention claimed is:

1. A tightening tool having an end comprising:
a protuberance with a substantially spherical surface, which is complementarily coupleable in a recess on a free base of a screw head; the recess has axial projections extending from inside the recess and an edge of a wall with a curved convex surface and transverse section decreasing towards the inside of the recess; wherein said axial projections are configured to transmit torque of the tightening tool on the screw; and the protuberance of which has meridional grooves, which couple on the axial projections, wherein said grooves start from the base of said protuberance, and reach areas close to a pole thereof, the grooves having a curved concave transverse section and a curved longitudinal section between opposed grooves, both the curved transverse section and the curved longitudinal section decreasing towards the pole of said protuberance, and being separated from one another by spherical lunes, which start from the base of the protuberance and reach the areas close to the pole, the spherical lunes having a curved convex external surface which is coincident with the protuberance.

2. Tightening tool according to claim 1, wherein the spherical lunes are separated from one another with a maximum width smaller than a separation between consecutive axial projections of the recess of the screw head.

3. A tightening tool according to claim 1, the screw head comprising a recess on the free base of the screw head, the recess has inside, axial projections extending from inside the edge of the wall with a curved convex surface and transverse section decreasing towards the inside of the recess wherein the axial projections do not reach the bottom of the recess and are circumferentially separated from one another by a distance greater than a maximum width of said axial projections.

* * * * *